United States Patent
Kaczor

(10) Patent No.: US 11,087,491 B2
(45) Date of Patent: Aug. 10, 2021

(54) METHOD FOR DETERMINING A COORDINATE OF A FEATURE POINT OF AN OBJECT IN A 3D SPACE

(71) Applicant: Aptiv Technologies Limited, St. Michael (BB)

(72) Inventor: Krzysztof Kaczor, Zakopane (PL)

(73) Assignee: Aptiv Technologies Limited, St. Michael (BB)

( * ) Notice: Subject to any disclaimer, the term of this patent is extended or adjusted under 35 U.S.C. 154(b) by 104 days.

(21) Appl. No.: 16/560,088

(22) Filed: Sep. 4, 2019

(65) Prior Publication Data
US 2020/0082564 A1   Mar. 12, 2020

(30) Foreign Application Priority Data

Sep. 12, 2018 (EP) .................................... 18194116
Aug. 14, 2019 (EP) .................................... 19191839

(51) Int. Cl.
*G06K 9/00* (2006.01)
*G06T 7/73* (2017.01)
*G06F 3/01* (2006.01)
*B60K 35/00* (2006.01)

(52) U.S. Cl.
CPC ............... *G06T 7/74* (2017.01); *B60K 35/00* (2013.01); *G06F 3/017* (2013.01); *G06K 9/00355* (2013.01); *G06K 9/00845* (2013.01); *B60K 2370/146* (2019.05)

(58) Field of Classification Search
CPC ............................ B60K 2370/146; G06T 7/74
See application file for complete search history.

(56) References Cited

U.S. PATENT DOCUMENTS

| | | | |
|---|---|---|---|
| 8,692,768 B2* | 4/2014 | Chtchetinine | G06F 3/0325 345/157 |
| 9,052,744 B2* | 6/2015 | Ma | G06F 3/0325 |
| 9,182,838 B2* | 11/2015 | Kikkeri | G06F 3/017 |
| 2010/0102980 A1* | 4/2010 | Troy | G05B 19/042 340/686.6 |
| 2010/0190610 A1* | 7/2010 | Pryor | G16H 20/60 482/8 |
| 2013/0314311 A1 | 11/2013 | Kuhlman et al. | |
| 2013/0325256 A1 | 12/2013 | Taylor et al. | |

(Continued)

FOREIGN PATENT DOCUMENTS

| EP | 2713240 A2 | 4/2014 |
|---|---|---|
| EP | 3070645 A1 | 9/2016 |
| WO | 2013/101047 A1 | 7/2013 |

*Primary Examiner* — Hadi Akhavannik
(74) *Attorney, Agent, or Firm* — Colby Nipper PLLC

(57) ABSTRACT

A method for determining a coordinate of a feature point of an object in a 3D space comprises: arranging at least one dedicated pointer in the 3D space in a pre-determined relation to the feature point of the object in the 3D space, wherein each dedicated pointer has at least one visible feature in line of sight of the camera; capturing at least one image by using the camera; performing image feature detection on the at least one captured image to determining a coordinate of the respective at least one visible feature of each dedicated pointer; and determining the coordinate of the feature point of the object in the 3D space based on the determined coordinate of the respective at least one visible feature of each dedicated pointer.

26 Claims, 7 Drawing Sheets

(56) References Cited

U.S. PATENT DOCUMENTS

| | | |
|---|---|---|
| 2014/0177393 A1 | 6/2014 | Menne et al. |
| 2014/0350942 A1 | 11/2014 | Kady et al. |
| 2016/0132126 A1 | 5/2016 | Van Laack et al. |
| 2016/0162082 A1* | 6/2016 | Schwesinger ........... G06F 3/017 345/173 |
| 2017/0190336 A1 | 7/2017 | Vijayan et al. |
| 2017/0191838 A1 | 7/2017 | Laur et al. |
| 2017/0344838 A1 | 11/2017 | Zhou et al. |
| 2018/0157268 A1 | 6/2018 | Mangal et al. |
| 2019/0034714 A1 | 1/2019 | Barth et al. |
| 2019/0126889 A1 | 5/2019 | Oman et al. |

* cited by examiner

METHOD FOR DETERMINING A COORDINATE OF A FEATURE POINT OF AN OBJECT IN A 3D SPACE

CROSS-REFERENCE TO RELATED APPLICATION

This application claims the benefit under 35 U.S.C. § 119(a) of European Patent Application EP 18194116.2, filed Sep. 12, 2018, the entire disclosure of which is hereby incorporated herein by reference. This application claims the benefit under 35 U.S.C. § 119(a) of European Patent Application EP 19191839.0, filed Aug. 14, 2019, the entire disclosure of which is hereby incorporated herein by reference.

TECHNICAL FIELD OF INVENTION

The present invention relates to a method for determining a coordinate of a feature point of an object in a 3D space, for example to calibrate objects used in a 3D gesture recognition system in a vehicle.

BACKGROUND OF DISCLOSURE

Passenger cars are often equipped with multimedia systems, and the provision of car vision is gaining in importance, and cameras are being applied in many different areas of the car. For example, car vision can be applied to enhance the safety of operating the vehicle, for example by providing night vision based warning systems. In a different example, car vision is implemented to improve driving comfort and driver experience, for example by enabling a driver interface based on 3D gesture recognition systems.

Recently, gesture recognition systems are evolving more towards interior sensing systems which are focused not only on gesture recognition but also on monitoring whether the driver has correct position while driving (e.g. whether he holds his hands on the steering wheel), whether the passenger seat is occupied by an adult person or by a child, or to detect other objects inside the car, like a notebook, etc.

One feature which can be provided in such interior sensing systems is to allow tracking the driver and passenger hands, for example to detect gestures indicated by the persons involved.

Such features often involve identifying an object being pointed at by a finger of a hand, and thus require a system internal representation of relevant objects in the car. For example, in order to determine if the driver's hands are being placed on the steering wheel, information about the current position and perhaps also the orientation of the steering wheel is required.

It may also be desired to distinguish if the driver is pointing at the instrument cluster, towards a side window or a particular rear-view mirror of the car, or any other item which can be user controlled. In this way, the driver can selectively operate different devices of the car using convenient gesture control, for example to map a particular travel information or mirror view to the instrument cluster, or to open or close a particular side window of the car, etc.

For this purpose, the locations of the different objects of the car are expressed by coordinates of points allowing an internal reconstruction (or approximation) at a particular location in space, for example in a 3D Cartesian coordinate system.

Such an internal reconstruction of objects does not require all points of the object to be determined and processed. It is generally sufficient to locate particular features of an object to detect its position and orientation, such as for example the corners of a side window or instrument cluster. Such features of objects are called feature points and are selected to allow the internal representation (or approximation) of the underlying object.

It follows that an important challenge of providing car vision services is related to the location calibration procedure which aims at mapping items and devices of a car, in particular of the car interior, to provide a 3D representation which is suitable for the vision system image processing.

A gesture recognition system may require different types of mapped objects, for example to define regions and zones in the operating space to improve the safety and efficiency of the gesture based control.

For example, the mapped objects may include:

Exclusion boxes—relate to virtual objects existing only inside the vision system to define a space where the gesture recognition system should reject recognized gestures. For example, a steering wheel and its close proximity can be enclosed in an exclusion box to prevent the detection and gesture control execution of unintended gestures, when the driver is holding his hand on the steering wheel while driving.

Exclusion surface—relates to an object that maps the shape of an object, for example the car dashboard and can be positioned in front of the car dashboard. In this example, it may be desired that gestures can only be recognized in front of this surface, such as to prevent gestures from being detected and used for gesture control when the driver is using his hand and fingers to operate dashboard elements (e.g. radio buttons) behind the exclusion surface.

Pointing zone—relates to objects that map the surface of real or virtual elements to define objects which can be pointed to by the driver. For example, if the driver points to a pointing zone corresponding to a side mirror, the gesture recognition system can switch a display in the car dashboard to show a video stream provided by a camera included in the side mirror.

In any case, objects can be divided into two main classes: visible and invisible objects. Visible objects are the objects having all their feature points visible in the field of view (FOV) of a camera used in the car vision system. In turn, invisible objects are objects having at least one feature point which is not visible in the FOV of the camera.

A feature point of an object can be invisible because of different reasons. For example, the feature point can be outside the FOV of the camera, can be obscured or covered by an obstacle, when viewed from the point of view of the camera, or poor illumination conditions can prevent the object from being properly light exposed and captured by the camera. It will be understood that the terms "invisible" and the expression "outside the FOV of the camera" may be used interchangeably.

For example, a top part of a display may include a feature point which is located outside and is thus not visible within the FOV of the camera. Accordingly, such a display is regarded as being invisible to the car vision system.

Similarly, the tip of a driver's finger may be obscured to the camera by another part of the human body, such as for example a hand or an upper body part, or by an instrument handle, bag, luggage, clothes or any other physical item which can be present in the interior of the car.

Generally, it is more straightforward to detect the coordinates of visible feature points of objects. For example, gesture recognition systems are often implemented using a 3D ToF (Time-of-Flight) camera, allowing the 3D coordinates of detected visible feature points to be extracted straight from the image data. In this case, the visible feature points can be detected in the image by conventional image feature or pattern recognition algorithms.

It follows that the detection of invisible feature points can represent a much more difficult and challenging task.

Methods are known and used in the prior-art to solve this problem and generally involve performing manual measurements. For example, such method may include using a measuring tape or other meter devices for measuring and manually mapping coordinates of invisible feature points, relative to a coordinate system of the camera.

Such methods are very slow and difficult to perform, error prone, and may require tedious trial and error steps to calibrate the respective coordinates with sufficient precision.

In view of the above, it is an object of the present invention to provide an improved method for determining the coordinates of objects.

SUMMARY OF THE DISCLOSURE

The present disclosure provides a method (which may be a computer implemented method), a computer system and a non-transitory computer readable medium according to the independent claims. Embodiments are given in the sub-claims, the description and the drawings.

In one aspect, the present disclosure is directed at a method for determining a coordinate of a feature point of an object in a 3D space, comprising: arranging at least one dedicated pointer in the 3D space in a pre-determined relation to the feature point, wherein each dedicated pointer has at least one visible feature in line of sight of a camera; capturing at least one image by using the camera; performing image feature detection on the at least one captured image to determine a coordinate of the respective at least one visible feature of each dedicated pointer; and determining the coordinate of the feature point based on the determined coordinate of the respective at least one visible feature of each dedicated pointer.

In other words, one or more dedicated pointers may be arranged in a 3D space (for example a plurality of dedicated pointers in a common (or single) image or frame or sample; or for example one dedicated pointer in a different position and orientation in each of a plurality of images or frames or samples) so that one or more features are visible (in other words: are in a field of view) of a camera, and so that the one or more dedicated pointers are arranged in a pre-determined (spatial) relation to a feature point. The feature point may be outside the field of view of the camera (in other words: the feature point may be invisible). The feature point may be a point of relevance for further processing, for example, the feature point may be a point on a pre-determined component of a car, or may be a point used for defining an exclusion box, an exclusion surface or a pointing zone used in a 3D gesture recognition system.

It will be understood that the various embodiments are not restricted to any particular relation between the (at least partially visible) dedicated pointer and the (invisible) feature point, as long as the relation can be used to determine the position of the feature point based on one or more visible features of the dedicated pointer.

Coordinates of the visible features may be determined. It will be understood that a coordinate for each visible feature may be determined, and that although the singular expression "coordinate" is used, each coordinate may include more than one scalar number. For example, each coordinate may be a three-dimensional vector (for example represented by three real numbers), which may represent the position of a point or the direction of a vector in the 3D space. The coordinate may be given with respect to a specific base and/or coordinate system (for example a Cartesian coordinate system with the origin in the camera).

Arranging the one or more dedicated pointers in a pre-determined relation to the feature point may provide a relation between the coordinates of the visible features and the (invisible) feature point. As such, once the coordinates of the visible features are known, the coordinate of the feature point (which may be outside the field of view of the camera) may be determined based on the coordinates of the visible features and based on the relation between the coordinates of the visible features and the (invisible) feature point.

It will be understood that according to various embodiments, the relation between the one or more features on the one or more dedicated pointers and the pre-determined relation according to which the one or more dedicated pointers are arranged relative to the feature point allows for determination of the coordinate of the feature point once the coordinates of the one or more features on the one or more dedicated pointers are known.

According to another aspect, the at least one dedicated pointer may have at least two visible points in line of sight of the camera and one invisible point not in line of sight of the camera. The at least one visible feature may comprise the at least two visible points. Arranging the at least one dedicated pointer in the 3D space in the pre-determined relation to the feature point of the object in the 3D space may comprise arranging an invisible point of the at least one dedicated pointer on or close to the feature point of the object in the 3D space.

With a dedicated pointer with two visible points and one invisible point, the invisible point may be arranged on the feature point, so that based on the detected coordinates (corresponding to the positions) of the two visible points and based on the known relation between the two visible points and the invisible point, the coordinate of the feature point (which is identical to the coordinate of the invisible point, since the invisible point is arranged on the feature point) may be determined.

According to another aspect, the at least one dedicated pointer may comprise a first dedicated pointer and a second dedicated pointer; wherein the at least one visible feature in line of sight of the camera of the first dedicated pointer comprises a first reference point and a first direction vector; wherein the at least one visible feature in line of sight of the camera of the second dedicated pointer comprises a second reference point and a second direction vector; and wherein determining the coordinate of the respective at least one visible feature of each dedicated pointer comprises determining the position of the first reference point, the direction of the first direction vector, the position of the second reference point, and the direction of the second direction vector.

According to another aspect, arranging the at least one dedicated pointer in the 3D space in the pre-determined relation to the feature point may comprise arranging the first dedicated pointer in the 3D space so that the direction from the first reference point to the feature point is represented by the first direction vector and arranging the second dedicated pointer in the 3D space so that the direction from the second reference point to the feature point is represented by the second direction vector.

According to another aspect, the coordinate of the feature point may be determined based on a coordinate of a point where the distance between a first line through the determined position of the first reference point and having a direction corresponding to the determined direction of the first direction vector and a second line through the determined position of the second reference point and having a direction corresponding to the determined direction of the second direction vector comprises a minimum.

With two dedicated pointer, each with a (visible) reference points and a (visible) direction, and with arranging the dedicated pointers so that their direction is pointing towards the feature point, the coordinate of the feature point may be determined as the intersection of the two lines defined by the respective reference points and respective directions of the two dedicated pointers. It will be understood that the two lines intersect at the feature point if the dedicated pointers are arranged so that their respective directions (starting from the respective reference point) point exactly towards the feature point, and that the point of intersection is the feature point. If at least one of the respective directions does not exactly point towards the feature point, then then the intersection may not be the feature point (but may be close to the feature point if the deviation of the line from the feature point is small, for example below a pre-determined threshold), or the two lines may not intersect. If the lines do not intersect, then, instead of using the point of intersection, the point where the distance between the lines is a minimum may be determined as the position of the feature point.

According to another aspect, the at least one dedicated pointer may comprise a dedicated pointer having a plurality of visible features in line of sight of the camera, wherein the plurality of visible features may comprise a plurality of points arranged on a reference circle; and wherein determining the coordinate of the respective at least one visible feature of each dedicated pointer (200) may comprise determining the respective positions of the plurality of points arranged on the reference circle.

According to another aspect, arranging the at least one dedicated pointer in the 3D space in the pre-determined relation to the feature point may comprise arranging the dedicated pointer in the 3D space so that the center of the reference circle coincides with the feature point.

According to another aspect, the method may further comprise determining an observed circle based on the plurality of determined points arranged on the reference circle, and wherein the coordinate of the feature point may be determined based on a center of the observed circle.

With a dedicated pointer with a plurality of (visible) reference points, and with arranging the dedicated pointer so that a center of a circle through the plurality of reference points coincides with the feature point, the coordinate of the feature point may be determined as center of a circle through the determined reference points. It will be understood that if the positions of three reference points are determined, a circle through the three points with the determined positions may be determined. However, if more than three points (in other words: four or more points) are determined, and if the more than three determined positions are not located on a circle, it may not be possible to determine a circle through these more than three points, but instead a circle which fulfills a pre-determined criterion with respect to the determined points may be used to determine a circle, and the center of that circle may be determined as the position of the feature point. For example, a minimum least square method may be used to determine a circle so that the average sum of the distance between the circle and the determined positions is minimal.

According to another aspect, said 3D space may correspond to an interior space of a vehicle. According to another aspect, the feature point may be a feature point of a car window, preferably a corner of the car window, or a feature point of a car mirror, preferably a corner of an exterior rear view mirror. According to another aspect, the feature point may be a feature point of an exclusion box, exclusion surface or pointing zone used in a 3D gesture recognition system.

According to another aspect, the arranging, the capturing, and performing the image feature detection are carried out iteratively. In an example, the determining of the coordinate of the feature point may be included in the iteration.

For example, the method may start with the arranging, then proceed to the capturing and performing the image feature detection. Then the coordinate of the feature point may be determined. Subsequently, it may be determined whether another iteration is to be carried out. If it is determined that another iteration is to be carried out, the arranging, the capturing, performing the image feature detection, and the determination of the coordinate of the feature point may be repeated (with a different position and orientation of the dedicated pointer). In the determination of the coordinate of the feature point, not only the presently determined coordinate of the respective at least one visible feature of each dedicated pointer (in other words: coordinate of the respective at least one visible feature of each dedicated pointer of the present iteration) may be used, but also the respective coordinate(s) of the respective at least one visible feature of each dedicated pointer of the previous iteration(s) and the coordinate of the feature point that has been determined in the previous iteration(s) may be used to determine the coordinate of the feature point in the present iteration.

Then again, it may be determined whether another iteration is to be carried out. This iteration (in other words: loop of arranging, capturing, performing image feature detection, and determination of the coordinate of the feature point) may be repeated until it is determined that no further iteration is to be carried out. For example, it may be determined that no further iteration is to be carried out, if it is determined that the accuracy of the determined coordinate of the feature point is sufficient (for example, if the change of the determined coordinate of the feature point after the present iteration is below a pre-determined threshold).

According to another aspect, the at least one designated pointer corresponds to at least one physical item arranged in the 3D space, preferably an elongated physical item having an end pointing to the feature point of the object in the 3D space, preferably a physical item comprising plastic and/or paper.

In an example, a method for calibrating objects in a 3D space comprises: arranging a dedicated pointer in the 3D space, wherein the dedicated pointer has at least two visible points in line of sight of a camera and an invisible point which is not in line of sight of the camera; capturing an image by using the camera; performing image feature point detection on the captured image to determine the coordinates of the at least two visible points of the dedicated pointer; and determining the coordinate of the invisible point of the dedicated pointer based on the determined coordinates of the at least two visible points of the dedicated pointer, wherein the determined coordinate of the invisible point of the dedicated pointer corresponds to a coordinate of a feature point of an object in the 3D space.

In other words, a dedicated pointer is at least partly arranged in the FOV of a camera. The dedicated pointer can represent any physical object having visual features which can be captured by the camera. It will be understood that calibrating an object may be or may include determining a coordinate of a feature point of the object.

Thus, the designated pointer corresponds to a physical item arranged in the 3D space, such as for example an elongated physical item having an end pointing to an feature point of an object in the 3D space. Preferably, the designated pointer has an arrow or pointer shape, and further preferred comprises plastic or paper.

In any case, the dedicated pointer has at least two visible points in line of sight of the camera and also an invisible point which is not in line of sight of the camera.

After capturing an image with the camera, the captured image is used to detect and locate the at least two visible points of the dedicated pointer.

More specifically, an image feature point detection is performed on the captured image to determine the coordinates of the at least two visible points of the dedicated pointer. For example, as mentioned above, gesture recognition systems can be implemented using a 3D ToF (Time-of-Flight) camera, allowing the 3D coordinates of visible points of the dedicated pointer to be extracted straight from the image data. In this way, the visible points can be detected in the image by conventional image feature or pattern recognition algorithms.

Then, the coordinate of the invisible point of the dedicated pointer is determined based on the determined coordinates of the at least two visible points of the dedicated pointer.

In this respect, the determined coordinate of the invisible point of the dedicated pointer has been arranged to correspond to a coordinate of a feature point of an object in the 3D space, for example by arranging the invisible point of the dedicated pointer on or close to a feature point of an object which is invisible to the camera.

It follows that an invisible feature point of an object in the 3D space is determined based on the coordinates of the at least two visible points of the designated pointer.

This approach allows determining and calibrating the coordinates of objects which are at least partly invisible to the camera. As discussed above, this can be useful for calibrating an internal reconstruction (or approximation) of invisible objects in 3D space, for example for implementing a gesture recognition system in a car.

In this example, the 3D space can correspond to the interior and/or exterior space of a passenger vehicle. For example, the determined invisible point of the dedicated pointer can be arranged to correspond to a feature point of a car window, preferably a corner of the car window, or to a feature point of a car mirror, preferably a corner of an exterior rear view mirror. Alternatively, the invisible point of the dedicated pointer can correspond to a feature point of an exclusion box, exclusion surface, or pointing zone, or any other type of a mapped object used in, for example, a gesture recognition system.

In an example, the determined coordinates of the at least two visible points of the dedicated pointer are used to determine a translation vector in the 3D space, wherein the translation vector defines the spatial difference between one of the visible points of the dedicated pointer and the invisible point of the dedicated pointer.

For this purpose, the determined coordinates of the at least two visible points of the dedicated pointer can be used for determining the orientation of the translation vector in the 3D space.

Hence, if the length and orientation of the translation vector is known, the coordinate of the invisible point of the dedicated pointer can be determined by adding (or subtracting) the translation vector to (or from) the respective visible point of the dedicated pointer.

For example, in a 3D X,Y,Z Cartesian coordinate system, a translation vector T having the coordinate lengths (dx, dy, dz) can be efficiently described using a normalized representation:

$$T=[dx,dy,dz]=D \cdot [nx,ny,nz], \text{ wherein}$$

D is equal to the length of the translation vector T and [nx, ny, nz] represents a unit length vector in the 3D space pointing between said at least two visible points of the dedicated pointer, i.e. such that the length relations:

$$nx^2+ny^2+nz^2=1, \text{ and}$$

$$dx^2+dy^2+dz^2=D^2.$$

Thus, the orientation of the unit length vector [nx, ny, nz] defines the orientation of the translation vector T.

In an example, an image processing method is performed on the captured image to determine the orientation of the translation vector in the 3D space. For example, if said camera is a Time-of-Flight (ToF) camera, for example in a gesture recognition system, the image data can include information determining the orientation of the translation vector.

More specifically, the Time-of-Flight (ToF) camera image can be used to determine at least two depth signals to at least two visible points of the designated pointer, for example two visible points placed along the designated pointer. The depth signals correspond to distances from the camera to said visible points on the designated pointer, respectively, and can thus be used for determining first and second coordinates of the designated pointer. This allows calculating a vector indicating the direction of orientation of the designated pointer.

For example, the two visible points on the pointer may be provided by placing three highly reflective elements along the pointer, and the two visible points may be provided between the highly reflective elements. It will be understood that this is only an example, and that various methods for detecting a pointer (and visible points on the pointer) and depth sampling methods may be provided.

In an example, the designated pointer is provided with a pattern on its surface, and the captured camera image is used to perform a perspective analysis of the pattern such as to determine the orientation of the translation vector in the 3D space.

For example, the pattern can correspond to a box or a line pattern which is printed or otherwise provided on the visible surface of the dedicated pointer, and which changes its perspective view, as seen from the point of view of the camera, depending on the orientation of the designated pointer.

For example, the perspective difference between sidewall lengths of a box can be used as an indicator for the orientation of the designated pointer carrying the box shaped pattern.

The length of the translation vector can be determined by measuring the distance between one of the visible points of the dedicated pointer to the invisible point of the dedicated pointer.

In an example, the distance is measured by using a measuring device, for example manually and prior to capturing said image by using the camera, and further preferred by using a measuring tape or a laser meter measuring device.

It will be understood that the various methods may be computer implemented methods.

In another aspect, the present disclosure is directed at a computer system, said computer system comprising a plurality of computer hardware components configured to carry out several or all steps of the method (for example computer implemented method) described herein. The computer system can be part of a vehicle.

The computer system may comprise a plurality of computer hardware components (for example a processing unit, at least one memory unit and at least one non-transitory data storage). It will be understood that further computer hardware components may be provided and used for carrying out steps of the computer implemented method in the computer system. The non-transitory data storage and/or the memory unit may comprise a computer program for instructing the computer to perform several or all steps or aspects of the (computer implemented) method described herein, for example using the processing unit and the at least one memory unit.

In another aspect, the present disclosure is directed at a non-transitory computer readable medium comprising instructions for carrying out several or all steps or aspects of the method (for example computer implemented method) described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the method (for example computer implemented method) described herein.

BRIEF DESCRIPTION OF DRAWINGS

Further embodiments of the present invention are described in the following description of Figures. The present invention will be explained in the following by means of embodiments and with reference to drawings in which is shown.

DETAILED DESCRIPTION

Figure 1:
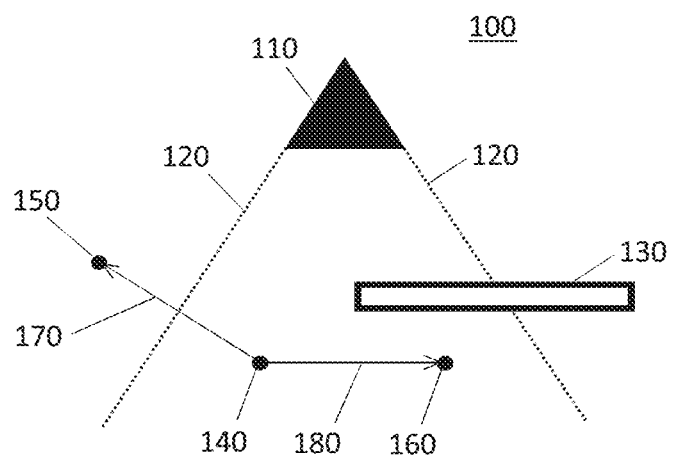
FIG. 1 is a camera FOV showing visible and invisible feature points.

In the following, any statement made having regard to the direction of a component are made relative to the position shown in the drawing and can naturally vary in the actual position of application.

FIG. 1 shows a top view of a camera arrangement 100 including a camera 110. In an example, the camera 110 can represent a Time-of-Flight (ToF) camera mounted to the inner ceiling of a car, for example to capture images used for driver gesture control.

Figure 2:
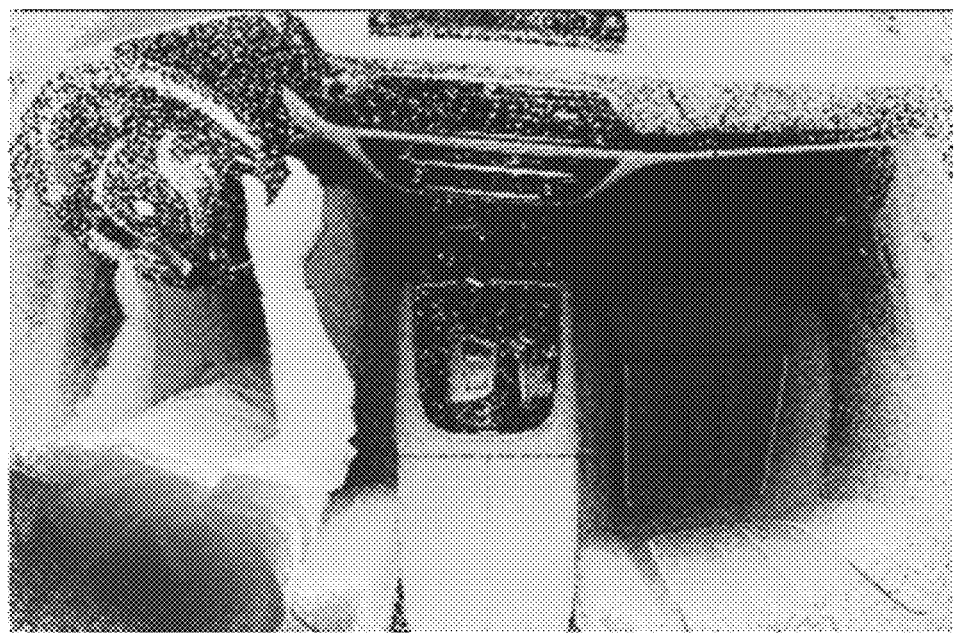
FIG. 2 is an image captured by a camera inside of a car.

FIG. 2 shows an example of an image which has been captured by such a camera. In a different example, the camera 110 can be mounted to the dashboard or to the ceiling closer to the sides or windows of the vehicle, depending on the driver gesture control system to be implemented, i.e. depending on the desired perspective provided by the captured images.

In FIG. 1, the camera has a FOV limited by the lens angle boundaries 120. Moreover, an obstacle 130 is located in the FOV of the camera 110 and further limits the camera image coverage.

For example, the point 140 shown in FIG. 1 is both inside the FOV of the camera 110 and is also not obscured by the obstacle 130. Thus, if the point 140 represents a feature point of an object, such as for example a corner of a car window, this feature point represents a visual point 140 of the object.

By contrast, the point 150 is located outside the FOV of the camera 110, and can thus only represent an invisible point 150 of an object, for example a corner of the car window which is located outside the camera coverage.

Similarly, the point 160 is located behind the object 130, and is thus obscured and invisible to the camera 110. Thus, also this point 160 can only represent an invisible point 160 of an object, for example a corner of the car window which is hidden behind a seat back or person inside the vehicle.

As explained in detail above, important challenges of providing car vision services are related to the calibration procedure which aims at mapping items and devices of a car, in particular of the car interior, to a 3D coordinate representation which is suitable for vision system image processing.

For example, a gesture recognition system may require the definition of regions and zones in the operating space to improve the safety and efficiency of the gesture based control. In particular, such systems may require determining and calibrating the coordinates of, for example, the above mentioned exclusion boxes, exclusion surfaces, and pointing zones, which may include objects having at least one feature point which is not visible in the FOV of the camera.

In view of this, the present invention determines the coordinate of an invisible point of an object based on the coordinates of visible points, i.e. based on coordinates which are visible as seen from the camera perspective.

In this respect, FIG. 1 shows that if the coordinate of the visible point 140 is known, and if the positioning of the invisible points 150, 160 is known relative to the visible point 140, the coordinates of the invisible points 150, 160 can be calculated.

For example, FIG. 1 shows a first translation vector 170 starting from the visible point 140 and ending in the invisible point 150, in the respective 3D space. Similarly, a second translation vector 170 starts from the visible point 140 and ends in the invisible point 160.

Thus, by adding the translation vectors 170, 180 to the coordinate of the visible point 140, it is possible to determine the coordinates of the invisible points 150, 160, respectively.

Figure 3:
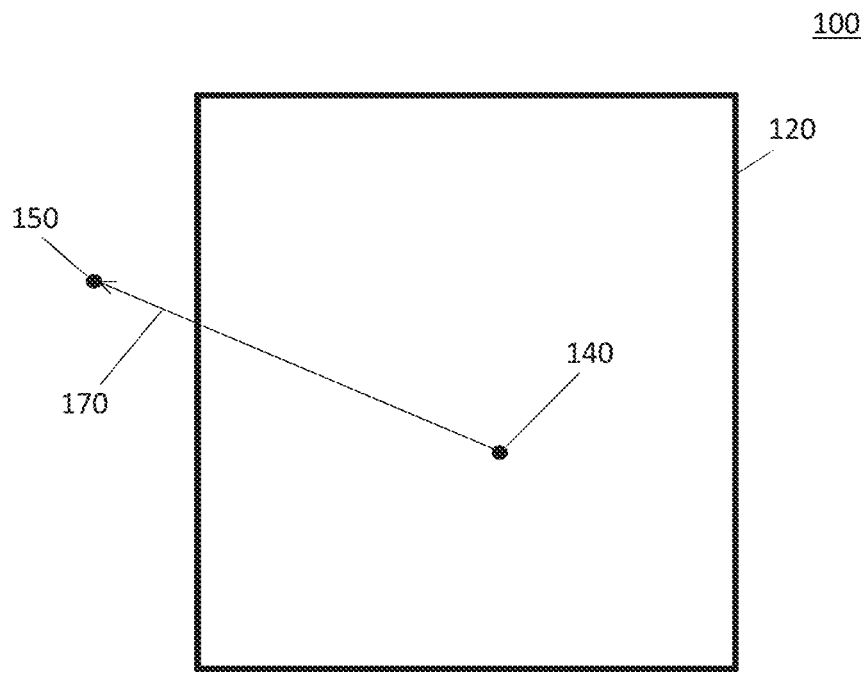
FIG. 3 is a camera FOV overlapped by a translation vector.

This scenario of a translation vector 170 connecting a visible point 140 and an invisible point 150, as seen from the camera 110 view of perspective, is shown in FIG. 3.

In this example, in order to determine the translation vector 170, the orientation of the translation vector 170 is estimated by image processing at least two points of the translation vector 170.

Figure 4:
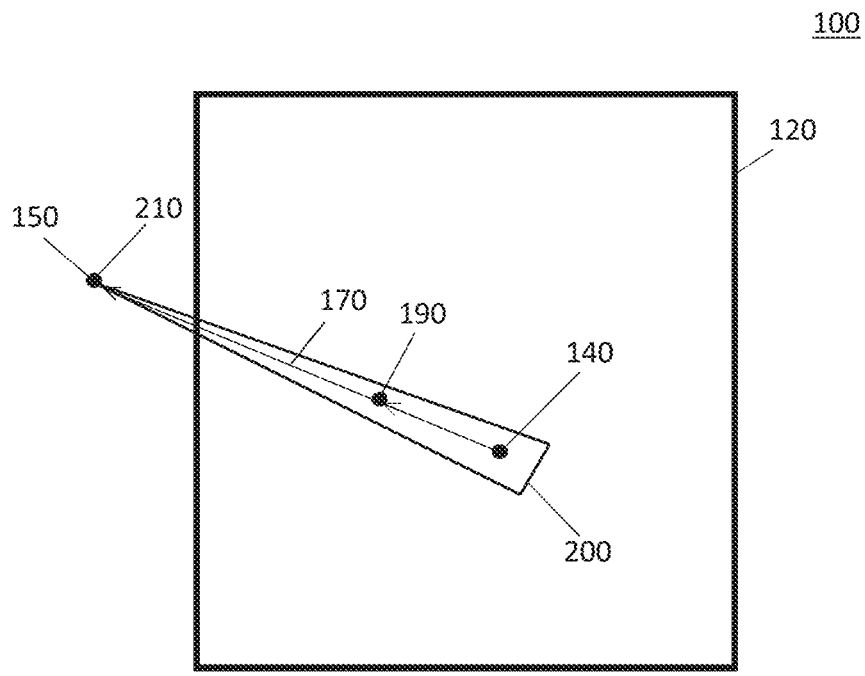
FIG. 4 is a camera FOV capturing a designated pointer.

More specifically, as shown in FIG. 4, a dedicated pointer 200 is arranged in the 3D space, wherein the dedicated pointer 200 has at least two visible points 140, 190 in line of sight of the camera 110.

Moreover, the dedicated pointer 200 provides a coupling between a visible point 140 and an invisible point 210 of the dedicated pointer 200, wherein the invisible point 210 of the dedicated pointer 200 is not in line of sight of the camera 110.

In this example, the designated pointer 200 corresponds to an elongated physical item having an end pointing 210 to the invisible feature point 150 of an object in the 3D space. More specifically, the designated pointer 200 has an arrow or pointer shape, and comprises for example rigid plastic or paper, or is formed of a string, coupling the visible point 190 and the invisible point 210 with a straight linear connection in the 3D space.

Thus, as shown in FIG. 4, the invisible point 210 of the dedicated pointer 200 corresponds to a coordinate of the invisible feature point 210 of an object, for example to the corner of a side window of the car.

After arranging the dedicated pointer 200, the corresponding FOV image shown in FIG. 4 is captured by the camera 110 and used to determine the coordinates of the visible points 140, 190 of the dedicated pointer 200.

For this purpose, in this example, the camera 110 provides a Time-of-Flight (ToF) camera image which is used to determine two depth signals to the two visible points 140, 190 of the designated pointer 200.

Thus, the depth signals correspond to distances from the camera 110 to said visible points 140, 190 on the designated pointer, respectively. It follows that the coordinates of the two visible points 140, 190 are calculated and used for determining the direction of orientation of the dedicated pointer 200. As explained above, the direction of orientation of the dedicated pointer 200 corresponds to the direction of orientation of the translation vector 170 shown in FIGS. 1, 3 and 4.

In the example shown in FIG. 4, the length of the translation vector 170 is determined by measuring the distance between the more central visible point 190 of the dedicated pointer 200 to the invisible point 210 of the dedicated pointer 200. For this purpose, the distance is measured manually by using a conventional laser meter measuring device, and prior to capturing the image by the camera 110. Hence, the determined translation vector 170 T has coordinate lengths (dx, dy, dz) which can be efficiently described using the normalized representation:

$$T=[dx,dy,dz]=D\cdot[nx,ny,nz], \text{ wherein}$$

D is equal to the determined length of the translation vector 200, and [nx, ny, nz] represents a unit length vector having the determined direction of orientation of the dedicated pointer 170 in the 3D space.

It follows that the coordinate of the invisible point 210 of the dedicated pointer 200 is determined by adding the translation vector 200 T to the coordinate of the more central visible point 190 of the dedicated pointer 200.

As the determined coordinate of the invisible point 210 of the dedicated pointer 200 corresponds to a coordinate of an invisible feature point of an object, this method allows determining and calibrating such invisible points of objects in an efficient and robust manner, with reduced labor and improved precision.

Figure 5:
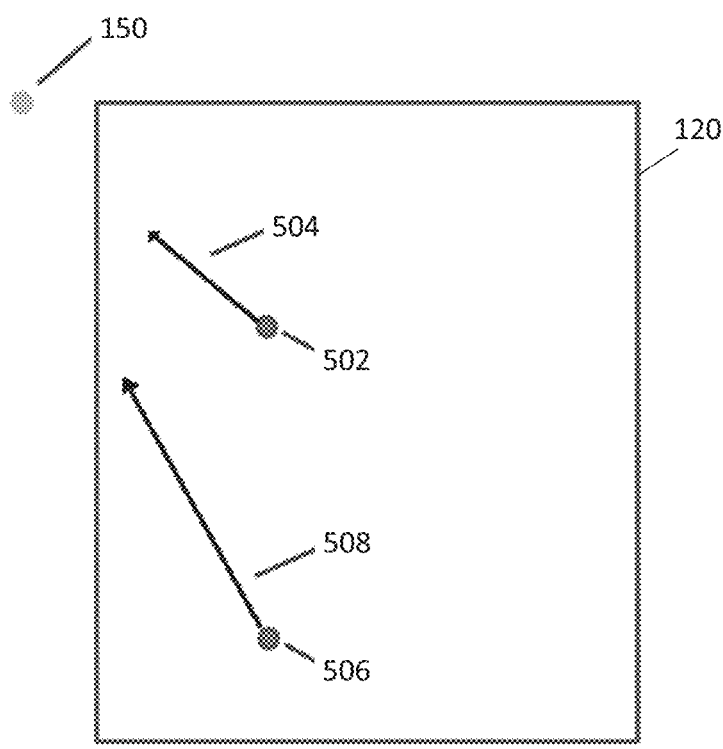
FIG. 5 is a camera FOV capturing reference points and direction vectors.

In the following, an embodiment making use of reference points and direction vectors will be described. FIG. 5 shows a camera FOV capturing reference points and direction vectors. A first reference point 502 with coordinates $P_1=(x_1, y_1, z_1)$ may be provided. A first direction vector 504 with coordinates (in other words: direction) $u=(u_x, u_y, u_z)$ may be related to the first reference point 502. A second reference point 506 with coordinates $P_2=(x_2, y_2, z_2)$ may be provided. A second direction vector 508 with coordinates (in other words: direction) $w=(w_x, w_y, w_z)$ may be related to the second reference point 506.

In comparison to the embodiment described with reference to FIG. 4, the present embodiment may provide at least two direction vectors (DV) together with the visible reference points (similar to the embodiment of FIG. 4), but the length of the pointer (providing the translation vector) may not be required. The direction vectors and the reference points may be co-mounted in the same way as described above. For example, two (dedicated) pointers may be provided. A first pointer may include the first reference point 502 and the first direction vector 504. A second pointer may include the second reference point 506 and the second direction vector 508. The first reference point 502, the first direction vector 504, the second reference point 506, and the second direction vector 508 may be visible features (in other words: they may be in the field of view 120). In an embodiment, the pointer may physically align with the invisible point 150 (so that for example a line from the point in the direction of the direction vector passes through the invisible point 150). In another embodiment, the pointer is aligned with the invisible point without any physical connection to the invisible point 150; for example, an operator may just roughly align the pointer to point towards the invisible point 150, or a laser pointer may be used to arrange the pointer so that the direction vector points towards the invisible point 150 (for example by arranging the dedicated pointer so that a laser pointer points towards the invisible point 150). The laser pointer may be arranged on the dedicated pointer, and may be provided in a fixed alignment with the reference point of the dedicated pointer and the direction vector of the dedicated pointer (so that the laser pointer points in a direction of the direction vector of the dedicated pointer, and the line of the laser pointer passes through the reference point).

It will be understood that instead of having two (or more) dedicated pointers with two (or more) respective positions and orientations in one frame (or sample or image), there may be provided only one dedicated pointer, and the respective positions and orientations of the one dedicated pointer may be provided in several frames (for example one position and one orientation in each frame; the dedicated pointer may have a different position and orientation in each frame, but in each frame, the dedicated pointer may be arranged in the pre-determined relation to the feature point).

According to various embodiments, it is assumed that the direction vectors 504, 508 point towards the invisible point 150. The anchor of the respective direction vectors is in the known visible reference point (for example the first point 502 for the first direction vector 504, and the second point 506 for the second direction vector 508). Having all these data, the line equation in 3D space that connects the reference points 502, 506 and the invisible point 150 can be defined in the following way:

$$l_1 = P_1 + u m \begin{cases} x = x_1 + u_x m \\ y = y_1 + u_y m \\ z = z_1 + u_z m \end{cases}$$

$$l_2 = P_2 + w n \begin{cases} x = x_2 + w_x n \\ y = y_2 + w_y n \\ z = z_2 + w_z n \end{cases}$$

n and m are real numbers (n, m∈R), which may indicate how far the invisible point 150 is away from the reference points 502, 506 (in terms of direction vectors). It will be understood that although two lines are illustrated for sake of simplicity, any number of lines may be used. Such a line may be defined for each pair of DV and reference point. For each two non-parallel lines, it is possible to find the values $m_o$ and $n_o$ of m and n respectively for which the distance between points ($P_{mo} \in l_1$ and $P_{no} \in l_2$) is the smallest. For example, if the lines intersect, this will be a point where the lines intersect (so that the distance between $P_{mo}$ and $P_{no}$ is equal to zero).

In an embodiment, several samples (or images or frames) of the pointer (with one pointer visible on each sample) may be captured, and the coordinates of the point for which the distance between lines (defined by the pointers) is minimal may be determined. This point may be determined for each two vectors, and there may be provided postprocessing (for example to remove outliers, or checks vectors colinearity). This determination may be carried out iteratively, taking into account the previously determined point, and a further point, based on further frames. As a result, the determined point may be converging to the invisible point (irrespective of whether the dedicated pointer is pointing towards the invisible point just roughly, for example by rough alignment based on visual judgment of a human operator, or more accurately, for example using a laser pointer). Convergence may be faster when the laser pointer is used.

Figure 6:
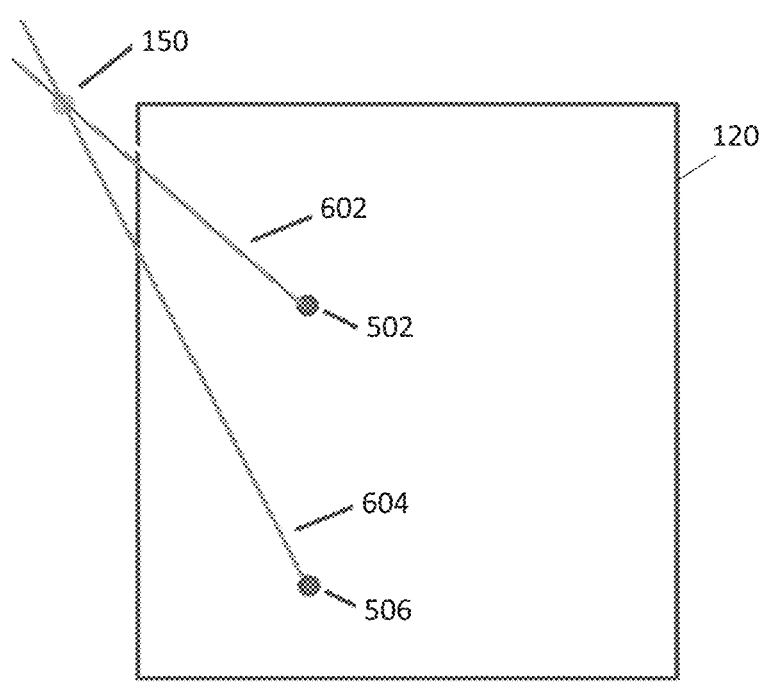
FIG. 6 is a camera FOV illustrating a smallest distance between lines.

FIG. 6 shows a camera FOV illustrating a smallest distance between lines. For example, a first line $l_1$ 602 and second line $l_2$ 604 are illustrated. If the direction vectors 504, 508 point towards the invisible point 150, it may be assumed that mean IP of the coordinates of the $P_{mo}$ and $P_{no}$ points defines the coordinates of the invisible point 150:

$$IP = \frac{P_{mo} + P_{no}}{2} = \frac{1}{2} \begin{cases} x_1 + u_x m_o + x_2 + w_x n_o \\ y_1 + u_y m_o + y_2 + w_y n_o \\ z_1 + u_z m_o + z_2 + w_z n_o \end{cases}$$

The task of the calculation of $m_o$ and $n_o$ may be an optimization task where a global minimum of the function that maps the m and n values into distance between the points must be found. Let define such distance function:

$$d_{l1l2} : d(m, n) = $$
$$\sqrt{(x_1 + u_x m - x_2 - w_x n)^2 + (y_1 + u_y m - y_2 - w_y n)^2 + (z_1 + u_z m - z_2 - w_z n)^2}$$

As the root function does not change the monotonicity of the subfunction, the results (in other words: the global minimum) stays the same when the squared distance function is taken for optimization. Therefore, the function for which a global minimum is to be found may have the following form:

$$dsq_{l1l2} : dsq(m, n) = d^2(m, n) = (x_1 + u_x m - x_2 - w_x n)^2 + $$
$$(y_1 + u_y m - y_2 - w_y n)^2 + (z_1 + u_z m - z_2 - w_z n)^2$$

In order to check if the following function has minimum, the sign of determinant of its derivation matrix may be checked. It will be understood that the following formulas do not include all calculation details and transitions, but they illustrated the concept idea behind the calculations. For this purpose of checking the determinant of the derivation matrix, partial derivatives may be calculated:

$$\frac{\partial^2 dsq}{d^2 m} = 2|u|^2$$

$$\frac{\partial^2 dsq}{d^2 n} = 2|w|^2$$

$$\frac{\partial^2 dsq}{dmdn} = 2(\vec{u} \cdot \vec{w})$$

The determinant of the derivation matrix may then be as follows:

$$\left\| \begin{matrix} \frac{\partial^2 dsq}{d^2 m} & \frac{\partial^2 dsq}{dmdn} \\ \frac{\partial^2 dsq}{dmdn} & \frac{\partial^2 dsq}{d^2 n} \end{matrix} \right\|$$

If the value of this determinant is greater than zero, then the function has an extreme point. Assuming that for two non-parallel lines, this condition will be always satisfied, it is possible to compute the optimal values of m and n. In order to do that, the equation where the first partial derivatives are equal to zero may be solved:

$$\begin{cases} \frac{\partial dsq}{dm} = 0 \\ \frac{\partial dsq}{dn} = 0 \end{cases} = \begin{cases} 2(m|u|^2 - n(\vec{u} \cdot \vec{w}) + (\vec{u} \cdot \vec{P_1}) - (\vec{u} \cdot \vec{P_2})) = 0 \\ 2(n|w|^2 - m(\vec{u} \cdot \vec{w}) - (\vec{w} \cdot \vec{P_1}) + (\vec{w} \cdot \vec{P_2})) = 0 \end{cases}$$

$$\begin{cases} m|u|^2 - n(\vec{u} \cdot \vec{w}) + (\vec{u} \cdot \vec{P_1}) - (\vec{u} \cdot \vec{P_2}) = 0 \\ n|w|^2 - m(\vec{u} \cdot \vec{w}) - (\vec{w} \cdot \vec{P_1}) + (\vec{w} \cdot \vec{P_2}) = 0 \end{cases}$$

$$\begin{cases} m|u|^2 - n(\vec{u} \cdot \vec{w}) - (\vec{u} \cdot \vec{P_1}) + (\vec{u} \cdot \vec{P_2}) \\ n|w|^2 - m(\vec{u} \cdot \vec{w}) - (\vec{w} \cdot \vec{P_1}) + (\vec{w} \cdot \vec{P_2}) = 0 \end{cases}$$

$$\begin{cases} m = \frac{n(\vec{u} \cdot \vec{w})}{|u|^2} + \frac{(\vec{u} \cdot \vec{P_2}) - (\vec{u} \cdot \vec{P_1})}{|u|^2} \\ n|w|^2 - m(\vec{u} \cdot \vec{w}) - (\vec{w} \cdot \vec{P_1}) + (\vec{w} \cdot \vec{P_2}) = 0 \end{cases}$$

In order to make the next formulae more transparent, the following denotations are introduced:

$$a = \frac{(\vec{u} \cdot \vec{w})}{|u|^2}$$

-continued $$b = \frac{(\vec{u} \cdot \vec{P_2}) - (\vec{u} \cdot \vec{P_1})}{|u|^2}$$

$$c = (\vec{w} \cdot \vec{P_2}) - (\vec{w} \cdot \vec{P_1})$$

$$m = na + b$$

Applying the provided denotation:

$$\begin{cases} m = an + b \\ n|w|^2 - (an+b)(\vec{u} \cdot \vec{w}) + c = 0 \end{cases}$$

$$\begin{cases} m = an + b \\ n|w|^2 - an(\vec{u} \cdot \vec{w}) - b(\vec{u} \cdot \vec{w}) + c = 0 \end{cases}$$

$$\begin{cases} m = an + b \\ n(|w|^2 - a(\vec{u} \cdot \vec{w})) - b(\vec{u} \cdot \vec{w}) + c = 0 \end{cases}$$

$$\begin{cases} m = an + b \\ n(|w|^2 - a(\vec{u} \cdot \vec{w})) = b(\vec{u} \cdot \vec{w}) - c \end{cases}$$

$$\begin{cases} m = an + b \\ n = \dfrac{b(\vec{u} \cdot \vec{w}) - c}{|w|^2 - a(\vec{u} \cdot \vec{w})} \end{cases}$$

The above formulas allow determining optimal values of m and n which defines points on the lines $l_1$ and $l_2$, respectively, between which the distance is smallest.

For example, to summarize, the following steps may be provided for determining the location of the invisible point 150 based on the first reference point 502, the first direction vector 504, the second reference point 506, and the second direction vector 508:

1. Find the coordinates of first visible point (in other words: of the first reference point 502).
2. Find the coordinates of the three reflection points on the pointer (in terms of pixels).
3. Find the coordinates of the two middle points on the pointer (in terms of pixels).
4. Convert pixels coordinates of the middle points into 3D coordinates using depth signal (VP1).
5. Compute first Direction Vector (DV1) 504 in 3D space.
6. Repeat steps 1-5 for the second visible point (VP2) (in other words: for the second reference point 506) and the second direction vector (DV2) 508.
7. Compute the value of the determinant of the partial derivatives matrix. If the function has extreme point, compute the optimal values of m and n according to the provided formulae.
8. Compute the coordinates of the optimal points $P_{mo}$ and $P_{no}$.
9. Compute the coordinates of the invisible point (IP) as the middle point between $P_{mo}$ and $P_{no}$.

Figure 7:
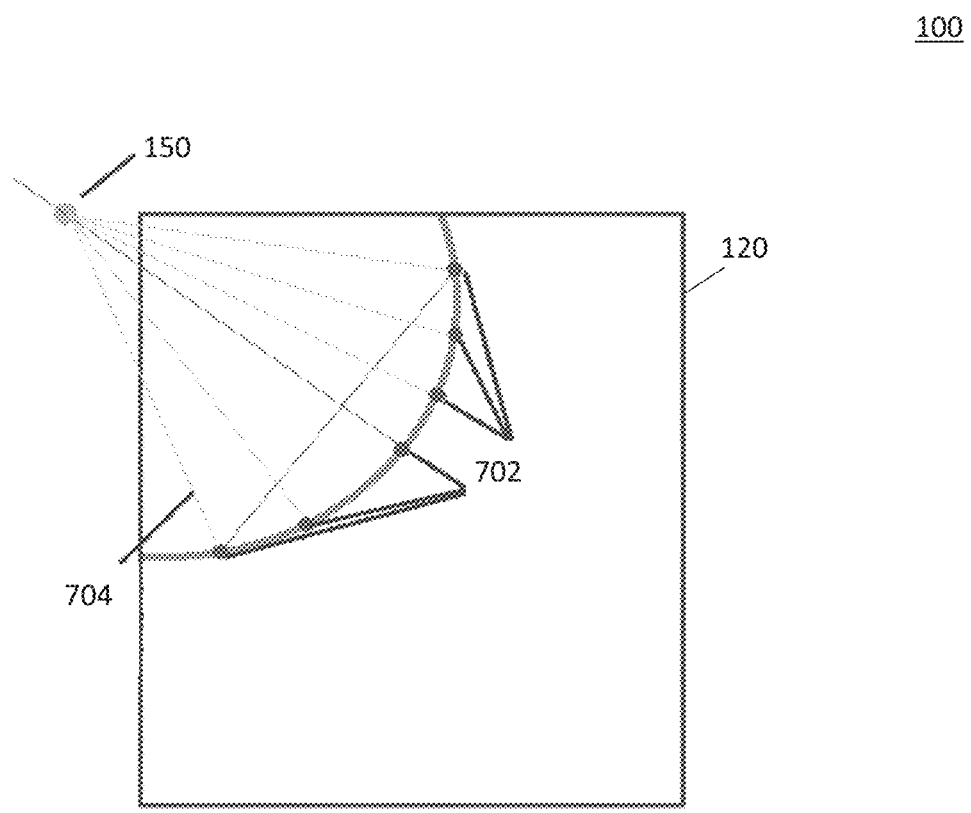
FIG. 7 is a camera FOV capturing a plurality of points on a circle.

It will be understood that the embodiments illustrated with reference to FIG. 4, FIG. 5, and FIG. 6 are just examples how the visible part of the FOV (including the visible features) can be used for computation of the coordinates of the invisible point. While these embodiments illustrate some examples of the relations between visible and invisible points, it will be understood that further such relations may be possible. For example, according to various embodiments, the coordinates of the invisible point may be determined based on determining the middle (in other words: center) of a circle:

FIG. 7 shows a camera FOV capturing a plurality of points on a circle. A plurality of visible points 702 may be provided on a circle. The circle may have a circle radius 704, and based on a plurality of visible points 702, the coordinates of the invisible point 150 may be determined. For example, based on the coordinates of each three visible points 702 that are not provided on a straight line, the properties of a circle (for example the center point of the circle and the radius of the circle) may be determined. If more than three points are visible, the properties of several circles may be determined (for each subset of three points of the more than three points), or a regression (for example mean-squared) method may be used to determine the coordinates of a circle that fits best through the more than three points (for example determine the coordinates of a circle that minimizes the mean squared distance between the circle and each of the points). In an embodiment, a dedicated pointer may include the center of the circle and the plurality of visible points. In another embodiment, a plurality of dedicated pointers (or one dedicated pointer which is captured in a plurality of samples) may be provided, which all point towards the feature point and thus, the visible points on the pointers form a (virtual) circle with the feature point as the center of the circle.

The various embodiments described above may have different characteristics. Therefore, depending on specific requirements or case specification, different embodiments may be selected. Table 1 depicts a comparison of different embodiments. Accuracy reflects how close a measurement is to a known or accepted value of the invisible reference point. Precision reflects how reproducible measurements are (irrespective of how close they are to the accepted value).

TABLE 1

| Embodiment | Application | Accuracy | Precision |
|---|---|---|---|
| Translation vector (FIG. 4) | Objects close to the FOV | OK | OK |
| Direction vectors (FIG. 5, FIG. 6) | Objects close and far from the FOV | Depends on the number of samples | Depends on the number of samples |
| Middle of the circle (FIG. 7) | Objects not too far from the FOV | OK | OK |

Figure 8A:
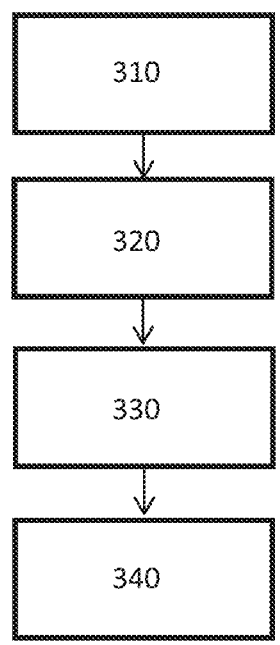
FIG. 8A is a flow diagram illustrating a method for calibrating objects in a 3D space.

The block diagram shown in FIG. 8A provides a summary of a corresponding method 300 for calibrating objects in a 3D space.

In step 310, a dedicated pointer 200 is arranged in the respective 3D space, wherein the dedicated pointer 200 has at least two visible points 140, 190 in line of sight of a camera 110 and an invisible point 210 which is not in line of sight of the camera 110. In step 320, a corresponding image is captured by using the camera 110.

In the following step 330, an image feature point detection is performed on the captured image to determine the coordinates of the at least two visible points 140, 190 of the dedicated pointer 200.

Then, in step 340, the coordinate of the invisible point 210 of the dedicated pointer 200 is determined based on the coordinates of the at least two visible points 140, 190 of the dedicated pointer 200, wherein the determined coordinate of the invisible point 210 of the dedicated pointer 200 corresponds to a coordinate of a feature point 150 of an object in the 3D space.

Figure 8B:
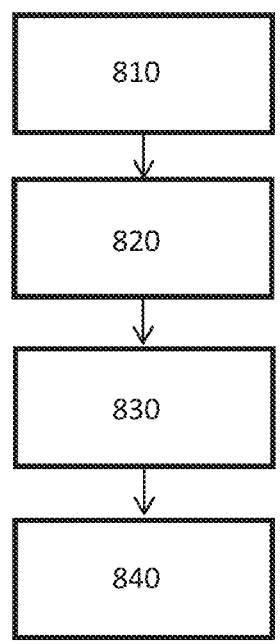
FIG. 8B is a flow diagram illustrating a method for determining a coordinate of a feature point of an object in a 3D space.

FIG. 8B shows a flow diagram 800 illustrating a method for determining a coordinate of a feature point of an object in a 3D space according to various embodiments. At 810, at least one dedicated pointer (200) may be arranged in the 3D space (310) in a pre-determined relation to the feature point (150). Each dedicated pointer (200) may have at least one visible feature in line of sight of a camera (110). At 820, at least one image may be captured by using the camera (320). At 830, image feature detection may be performed on the at least one captured image (330) to determine a coordinate of the respective at least one visible feature of each dedicated pointer (200). At 840, the coordinate of the feature point (150) may be determined based on the determined coordinate of the respective at least one visible feature of each dedicated pointer (200).

Steps 810, 820, 830 may be repeated for different position and orientation of the dedicated pointer (200), in other words: steps 810, 820, 830 may be carried out iteratively. In an embodiment, after each processing of step 810, 820, 830, step 840 may be carried out, and it may be determined, whether another iteration of steps 810, 820, 830 is necessary. For example, it may be determined whether the determined coordinate of the feature point (step 840) has changed compared to the previous iteration, and if the change of the coordinate of the feature point is below a pre-determined threshold, the iteration may stop and the present coordinate of the feature point of may be provided as the final result.

According to various embodiments, the at least one dedicated pointer (200) may have at least two visible points (140, 190) in line of sight of the camera (110) and one invisible point not in line of sight of the camera (110); wherein the at least one visible feature comprises the at least two visible points (140, 190). Arranging the at least one dedicated pointer (200) in the 3D space (310) in the pre-determined relation to the feature point (150) of the object in the 3D space may comprise arranging an invisible point of the at least one dedicated pointer (200) on or close to the feature point (150) of the object in the 3D space.

According to various embodiments, the at least one dedicated pointer (200) may comprise a first dedicated pointer and a second dedicated pointer. The at least one visible feature in line of sight of the camera of the first dedicated pointer may comprise a first reference point and a first direction vector. The at least one visible feature in line of sight of the camera of the second dedicated pointer may comprise a second reference point and a second direction vector. Determining the coordinate of the respective at least one visible feature of each dedicated pointer (200) may comprise determining the position of the first reference point, the direction of the first direction vector, the position of the second reference point, and the direction of the second direction vector.

According to various embodiments, arranging the at least one dedicated pointer in the 3D space in the pre-determined relation to the feature point (150) may comprise arranging the first dedicated pointer in the 3D space so that the direction from the first reference point to the feature point (150) is represented by the first direction vector and arranging the second dedicated pointer in the 3D space so that the direction from the second reference point to the feature point (150) is represented by the second direction vector.

According to various embodiments, the coordinate of the feature point (150) may be determined based on a coordinate of a point where the distance between a first line through the determined position of the first reference point and having a direction corresponding to the determined direction of the first direction vector and a second line through the determined position of the second reference point and having a direction corresponding to the determined direction of the second direction vector comprises a minimum.

According to various embodiments, the at least one dedicated pointer (200) may comprise a dedicated pointer having a plurality of visible features in line of sight of the camera, wherein the plurality of visible features comprises a plurality of points arranged on a reference circle. Determining the coordinate of the respective at least one visible feature of each dedicated pointer (200) may comprise determining the respective positions of the plurality of points arranged on the reference circle.

According to various embodiments, arranging the at least one dedicated pointer in the 3D space in the pre-determined relation to the feature point (150) may comprise arranging the dedicated pointer in the 3D space so that the center of the reference circle coincides with the feature point (150).

According to various embodiments, the method may further comprise determining an observed circle based on the plurality of determined points arranged on the reference circle. The coordinate of the feature point (150) may be determined based on a center of the observed circle.

According to various embodiments, said 3D space may correspond to an interior space of a vehicle.

According to various embodiments, the feature point (150) may be a feature point of a car window, preferably a corner of the car window, or a feature point of a car mirror, preferably a corner of an exterior rear view mirror.

According to various embodiments, the feature point (150) may be a feature point of an exclusion box, exclusion surface or pointing zone used in a 3D gesture recognition system.

According to various embodiments, the at least one designated pointer (200) may correspond to at least one physical item arranged in the 3D space, preferably an elongated physical item (200) having an end (210) pointing to the feature point (150) of the object in the 3D space, preferably a physical item comprising plastic and/or paper. Each of the steps 310, 320, 330, 340, 810, 820, 830, and/or 840 and/or the further steps described above may be performed by computer hardware components.

The following examples pertain to further embodiments. According to example 1, a method for calibrating objects in a 3D space (300), comprises: arranging a dedicated pointer in the 3D space (310), wherein the dedicated pointer (200) has at least two visible points (140, 190) in line of sight of a camera (110) and an invisible point (210) which is not in line of sight of the camera (110); capturing an image by using the camera (320); performing image feature point detection on the captured image (330) to determine the coordinates of the at least two visible points (140, 190) of the dedicated pointer (200); and determining the coordinate of the invisible point of the dedicated pointer (340) based on the determined coordinates of the at least two visible points (140, 190) of the dedicated pointer (200), wherein the determined coordinate of the invisible point (210) of the dedicated pointer (200) corresponds to a coordinate of a feature point (150) of an object in the 3D space.

According to example 2, the subject-matter of example 1 further includes that determining the coordinates of the invisible point (340) of the dedicated pointer (200) comprises using the determined coordinates of the at least two visible points (140, 190) of the dedicated pointer (200) to determine a translation vector (170, 180) in the 3D space, wherein the translation vector (170, 180) defines the spatial difference between one of the visible points (140, 190) of the dedicated pointer (200) and the invisible point (210) of the dedicated pointer (200).

According to example 3, the subject-matter of example 2 further includes that determining the translation vector (170, 180) comprises using the determined coordinates of the at least two visible points (140, 190) of the dedicated pointer (200) to determine the orientation of the translation vector (200) in the 3D space, preferably to determine a normalized translation vector orientation representing a unit length vector in the 3D space pointing between said at least two visible points (140, 190) of the dedicated pointer (200).

According to example 4, the subject-matter of example 3 further includes performing image processing on the captured image to determine the orientation of the translation vector (170, 180) in the 3D space.

According to example 5, the subject-matter of example 4 further includes that said camera (110) is a Time-of-Flight (ToF) camera (110), and wherein performing image processing on the captured image to determine the orientation of the translation vector in the 3D space includes using the Time-of-Flight (ToF) camera (110) image to determine at least two depth signals to at least two points (140, 190) along the designated pointer (200), preferably to at least two points (14, 190) of a reflective tape placed along the designated pointer (200).

According to example 6, the subject-matter of example 5 includes that the determined depth signals are used for computing the spatial different between points on the designated pointer, wherein the points correspond to said visual points (140, 190) of the designated pointer (200).

According to example 7, the subject-matter of example 4 includes that performing image processing on the captured image to determine the orientation of the translation vector in the 3D space includes performing a perspective analysis of a pattern detected along the designated pointer (200).

According to example 8, the subject-matter of any one of examples 3 to 7 further includes determining the length of the translation vector (200) in the 3D space by measuring the distance between one of the visible points (140, 190) of the dedicated pointer (200) to the invisible point (210) of the dedicated pointer (200).

According to example 9, the subject-matter of example 8 includes that said measuring the distance is performed by using a measuring device to determine a length of the dedicated pointer (200), preferably a measuring tape or a laser meter measuring device.

According to example 10, the subject-matter of any one of examples 8 or 9 further includes that said measuring the distance is performed prior to capturing said image by using the camera (310).

According to example 11, the subject-matter of any one of examples 1 to 10 further includes that said 3D space corresponds to an interior space of a vehicle.

According to example 12, the subject-matter of example 11 includes that said invisible point (210) of the dedicated pointer (200) corresponds to a feature point (150) of a car window, preferably a corner (150) of the car window, or to a feature point (150) of a car mirror, preferably a corner (150) of an exterior rear view mirror.

According to example 13, the subject-matter of example 11 includes that said invisible point (210) of the dedicated pointer (200) corresponds to a feature point (150) of an exclusion box, exclusion surface or pointing zone used in a 3D gesture recognition system.

According to example 14, the subject-matter of any one of examples 1 to 13 further includes that the designated pointer (200) corresponds to a physical item arranged in the 3D space, preferably an elongated physical item (200) having an end (210) pointing to the feature point (150) of the object in the 3D space, preferably a physical item comprising plastic and/or paper.

LIST OF REFERENCE NUMERALS

100, camera arrangement
110, camera
120, camera FOV boundary
130, obstacle
140, 190 visual point
150, 160 invisible feature point of an object
170, 180, translation vector
200, dedicated pointer
210, invisible point of a dedicated pointer
300, method for calibrating objects in a 3D space
310, arrange dedicated pointer
320, capture image by camera
330, determine coordinates of visible points
340, determine coordinate of invisible point
502, first reference point
504, first direction vector
506, second reference point
508, second direction vector
602, first line
604, second line
702, plurality of visible points
704, circle radius
800, flow diagram illustrating a method according to various embodiments
810, arrange at least one dedicated pointer
820, capture an image
830, perform image feature detection
840, determine the coordinate of the feature point

I claim:

1. A method for determining a coordinate of a feature point of an object in a 3D space, comprising:
arranging, with a computer, at least one dedicated pointer in a 3D space in a pre-determined relation to the feature point, wherein each dedicated pointer has at least one visible feature in line of sight of a camera;
capturing at least one image by using the camera;
performing image feature detection on the at least one captured image, with the computer, to determine the coordinate of the respective at least one visible feature of each dedicated pointer; and
determining, with the computer, the coordinate of the feature point based on the determined coordinate of the respective at least one visible feature of each dedicated pointer, wherein:
the at least one dedicated pointer comprises a first dedicated pointer and a second dedicated pointer;
the at least one visible feature in line of sight of the camera of the first dedicated pointer comprises a first reference point and a first direction vector;
the at least one visible feature in line of sight of the camera of the second dedicated pointer comprises a second reference point and a second direction vector; and
determining the coordinate of the respective at least one visible feature of each dedicated pointer comprises determining a position of the first reference point, a direction of the first direction vector, the position of the second reference point, and the direction of the second direction vector.

2. The method of claim 1,
wherein the at least one dedicated pointer has at least two visible points in line of sight of the camera and one invisible point not in line of sight of the camera; wherein the at least one visible feature comprises the at least two visible points; and
wherein arranging the at least one dedicated pointer in the 3D space in the pre-determined relation to the feature point of the object in the 3D space comprises arranging an invisible point of the at least one dedicated pointer on or close to the feature point of the object in the 3D space.

3. The method of claim 1,
wherein arranging the at least one dedicated pointer in the 3D space in the pre-determined relation to the feature point comprises arranging the first dedicated pointer in the 3D space so that the direction from the first reference point to the feature point is represented by the first direction vector and arranging the second dedicated pointer in the 3D space so that the direction from the second reference point to the feature point is represented by the second direction vector.

4. The method of claim 1,
wherein the coordinate of the feature point is determined based on the coordinate of a point where a distance between a first line through the determined position of the first reference point and having the direction corresponding to the determined direction of the first direction vector and a second line through the determined position of the second reference point and having the direction corresponding to the determined direction of the second direction vector comprises a minimum.

5. The method claim 1,
wherein the at least one dedicated pointer comprises a dedicated pointer having a plurality of visible features in line of sight of the camera, wherein a plurality of visible features comprises a plurality of points arranged on a reference circle; and
wherein determining the coordinate of the respective at least one visible feature of each dedicated pointer further comprises determining the respective positions of the plurality of points arranged on the reference circle.

6. The method of claim 5,
wherein arranging the at least one dedicated pointer in the 3D space in the pre-determined relation to the feature point comprises arranging the dedicated pointer in the 3D space so that a center of the reference circle coincides with the feature point.

7. The method of claim 5, further comprising:
determining the coordinate of the feature point based on an observed circle that is determined based on a plurality of determined points arranged on the reference circle.

8. The method of claim 1,
wherein said 3D space corresponds to an interior space of a vehicle.

9. The method of claim 1,
wherein the feature point is at least one of a feature point of a car window, a feature point of a car mirror, and a feature point of an exclusion box, exclusion surface or pointing zone used in a 3D gesture recognition system.

10. The method of claim 9,
wherein the feature point of the car window is a corner of the car window, and the feature point of the car mirror is a corner of an exterior rear-view mirror.

11. The method of claim 1,
wherein the arranging, the capturing, and performing the image feature detection are carried out iteratively.

12. The method of claim 1, wherein the at least one designated pointer corresponds to at least one physical item arranged in the 3D space including, an elongated physical item having an end pointing to the feature point of the object in the 3D space, the elongated physical item comprising at least one of plastic or paper.

13. A system for determining a coordinate of a feature point of an object in a 3D space, comprising:
a camera configured to capture at least one image of a visible feature; and
a computer configured to arrange at least one dedicated pointer in a 3D space in a pre-determined relation to a feature point;
wherein each dedicated pointer has at least one visible feature in a line of sight of the camera; wherein the computer is further configured to:
perform image feature detection on the at least one captured image to determine a coordinate of the respective at least one visible feature of each dedicated pointer; and
determine the coordinate of the feature point based on the determined coordinate of the respective at least one visible feature of each dedicated pointer, wherein:
the at least one dedicated pointer comprises a first dedicated pointer and a second dedicated pointer;
the at least one visible feature in the line of sight of the camera of the first dedicated pointer comprises a first reference point and a first direction vector;
the at least one visible feature in the line of sight of the camera of the second dedicated pointer comprises a second reference point and a second direction vector; and
the computer is configured to determine the coordinate of the respective at least one visible feature of each dedicated pointer by determining a position of the first reference point, a direction of the first direction vector, the position of the second reference point, and the direction of the second direction vector.

14. The system of claim 13,
wherein the at least one dedicated pointer has at least two visible points in line of sight of the camera and one invisible point not in line of sight of the camera; wherein the at least one visible feature comprises the at least two visible points; and
wherein arranging the at least one dedicated pointer in the 3D space in the pre-determined relation to the feature point of the object in the 3D space comprises arranging an invisible point of the at least one dedicated pointer on or close to the feature point of the object in the 3D space.

15. The system of claim 13, wherein:
the computer is configured to arrange the at least one dedicated pointer in the 3D space in the pre-determined relation to the feature point by arranging the first dedicated pointer in the 3D space so that the direction from the first reference point to the feature point is represented by the first direction vector and arranging the second dedicated pointer in the 3D space so that the direction from the second reference point to the feature point is represented by the second direction vector.

16. The system of claim 13, wherein:
the coordinate of the feature point is determined based on the coordinate of a point where a distance between a first line through the determined position of the first reference point and having the direction corresponding to the determined direction of the first direction vector and a second line through the determined position of the second reference point and having the direction corresponding to the determined direction of the second direction vector comprises a minimum.

17. The system claim 13,
wherein the at least one dedicated pointer comprises a dedicated pointer having a plurality of visible features in line of sight of the camera, wherein a plurality of visible features comprises a plurality of points arranged on a reference circle; and wherein determining the coordinate of the respective at least one visible feature of each dedicated pointer further comprises determining the respective positions of the plurality of points arranged on the reference circle.

18. The system of claim 17,
wherein computer is configured to arrange the at least one dedicated pointer in the 3D space in the pre-determined relation to the feature point comprises arranging the dedicated pointer in the 3D space so that a center of the reference circle coincides with the feature point.

19. The system of claim 17, further comprising:
determining the coordinate of the feature point based on an observed circle that is determined based on a plurality of determined points arranged on the reference circle.

20. The system of claim 13,
wherein said 3D space corresponds to an interior space of a vehicle.

21. The system of claim 13,
wherein the feature point is at least one of a feature point of a car window, a feature point of a car mirror, and a feature point of an exclusion box, exclusion surface or pointing zone used in a 3D gesture recognition system.

22. The system of claim 21,
wherein the feature point of the car window is a corner of the car window, and the feature point of the car mirror is a corner of an exterior rear-view mirror.

23. The system of claim 13,
wherein the computer is configured to arrange, capture, and perform the image feature detection iteratively.

24. The system of claim 13, wherein the at least one designated pointer corresponds to at least one physical item arranged in the 3D space including an elongated physical item having an end pointing to the feature point of the object in the 3D space, the elongated physical item comprising at least one of plastic or paper.

25. The method claim 2,
wherein the at least one dedicated pointer comprises a dedicated pointer having a plurality of visible features in line of sight of the camera, wherein a plurality of visible features comprises a plurality of points arranged on a reference circle; and
wherein determining the coordinate of the respective at least one visible feature of each dedicated pointer further comprises determining the respective positions of the plurality of points arranged on the reference circle.

26. The system claim 14,
wherein the at least one dedicated pointer comprises a dedicated pointer having a plurality of visible features in line of sight of the camera, wherein a plurality of visible features comprises a plurality of points arranged on a reference circle; and wherein determining the coordinate of the respective at least one visible feature of each dedicated pointer comprises determining the respective positions of the plurality of points arranged on the reference circle.

\* \* \* \* \*